UNITED STATES PATENT OFFICE.

ALTEN S. MILLER, OF NEW YORK, N. Y.

PACKING MATERIAL.

1,059,061.  Specification of Letters Patent.  Patented Apr. 15, 1913.

No Drawing.  Application filed August 23, 1911.  Serial No. 645,682.

*To all whom it may concern:*

Be it known that I, ALTEN S. MILLER, a citizen of the United States, residing at New York, in the county of New York and State of New York, have invented certain new and useful Improvements in Packing Materials, of which the following is a specification.

My present invention relates to an improved packing especially adapted for use in keeping tight the joints of pipes and vessels for natural and manufactured illuminating and fuel gas and oil. Heretofore difficulty has been experienced in keeping these joints gas and liquid tight, because the available kinds of packing were either inevitably porous or became so by the action of the gas or oil thereon. My present packing has the advantage of keeping the joints permanently tight. Of course, it will be understood that the joints to which I refer are not the screw-threaded joints formed where one pipe merely screw connects with another, but the type of joint made by slipping the end of one pipe into the enlarged end of another pipe, or by bringing together the ends of two pipes of uniform size and putting a sleeve over the two pipe ends. There is necessarily a considerable internal space between the enlarged end of the one pipe and the outside of the end of the other pipe, and also between the inside of the sleeve and the outside of the inserted pipes. It is in this internal space that the packing is inserted to make the joint tight and it is the object of my invention to produce a packing which will effectively accomplish this.

My improved packing consists of a packing material preferably a fibrous material such as jute, hemp, cotton, or wool, etc., but preferably jute on account of its cheapness,—with which has been incorporated soap. The finished form of packing is preferably a loosely twisted or braided rope of the soap incorporated fibrous material adapted to be laid into the joint, coil upon coil, and then rammed or otherwise forced hard into place, where it is held by a gland of lead, iron or other material, with the result that the packing keeps the finished joint perfectly tight because the soap fills all the pores and spaces, and furthermore does this permanently because it is not acted upon by the ingredients of the gas or oil in the pipe.

There are a number of ways of incorporating the soap with the packing material. To state some of them:—the packing material whether in the form of rope or otherwise may be dipped into the hot or melted soap and then after saturation, allowed to drain and dry when it will be ready for use; or to secure still more thorough incorporation of the soap with the packing material, it may be dipped into the soap or otherwise impregnated therewith in small portions or strands, which are then aggregated to make up the mass of the packing or in the case of strands, they may be twisted together or braided to form the finished rope-packing, this being the preferred form as already described.

The soap I use may be the ordinary cheap or crude soap.

What I claim is:—

1. A packing for the joints of gas pipes, comprising a body of fibrous material that is unaffected by gas, and a filling composed wholly of soap that is insoluble in and unaffected by gas.

2. A packing for the joints of gas pipes, comprising a body of vegetable fiber that is unaffected by gas, and a filling composed wholly of soap that is insoluble in and unaffected by gas, said soap filling the interstices and spaces in and around the fibrous body.

3. A packing suitable for the joints of gas and oil pipes and vessels, consisting of a fibrous packing material having soap mechanically carried thereby, so that when the packing is in place, the pores and spaces are filled with soap which is insoluble to the gas and oil contained in the pipe or vessel.

In testimony whereof I affix my signature in presence of two witnesses.

ALTEN S. MILLER.

Witnesses:
E. W. SCHERR, Jr.,
ALAN C. McDONNELL.